No. 634,571.  
J. C. CHORLEY.  
Patented Oct. 10, 1899.
METHOD OF PRODUCING CELLULOSE FILMS FOR PHOTOGRAPHIC OR OTHER PURPOSES.
(Application filed Mar. 21, 1899.)
(No Model.)
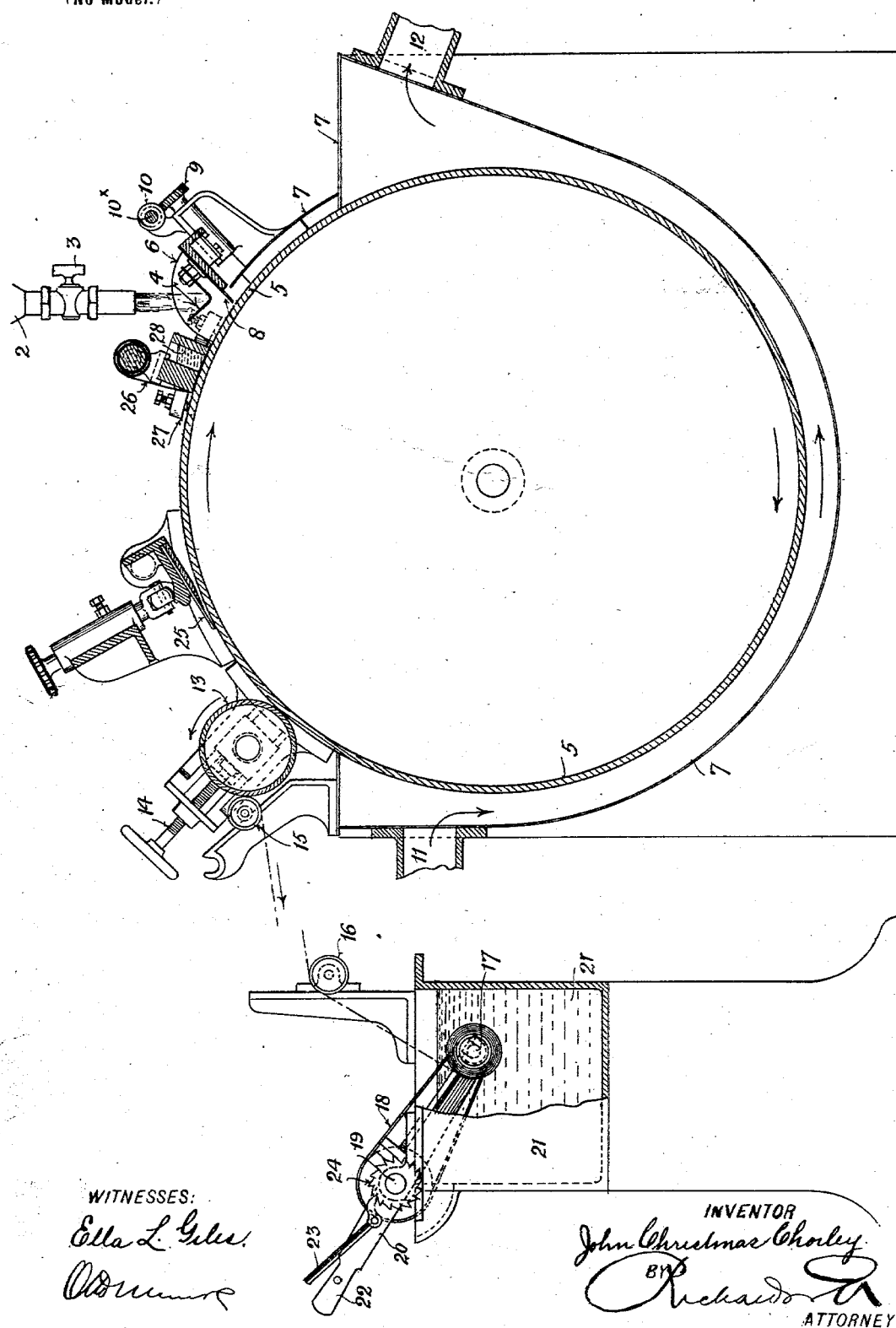
WITNESSES:  
Ella L. Giles
INVENTOR  
John Christmas Chorley  
BY  
Richardson  
ATTORNEYS

UNITED STATES PATENT OFFICE.

JOHN CHRISTMAS CHORLEY, OF WARRINGTON, ENGLAND.

METHOD OF PRODUCING CELLULOSE FILMS FOR PHOTOGRAPHIC OR OTHER PURPOSES.

SPECIFICATION forming part of Letters Patent No. 634,571, dated October 10, 1899.

Application filed March 21, 1899. Serial No. 709,944. (No specimens.)

*To all whom it may concern:*

Be it known that I, JOHN CHRISTMAS CHORLEY, a subject of the Queen of Great Britain, residing at Lodge Lane, Bewsey, Warrington, in the county of Lancaster, England, have invented certain new and useful Improvements in the Method of Producing Cellulose Films for Photographic or other Purposes, of which the following is a specification.

My invention relates to improvements in the method of producing cellulose films for photographic and other purposes; and the chief object of my invention is to enable the films to be produced in a sheet or web of any length desired and by a continuous operation.

In carrying out my invention I employ a machine such as that illustrated in longitudinal sectional elevation on the accompanying sheet of drawings, and I employ cellulose sulfocarbonate dissolved in water, which is known as "viscose," and is prepared as described in the specification to English Letters Patent numbered 8,700, and dated May 7, 1892. This solution is of suitable strength and is contained in a tank or hopper 2, which is placed at a convenient height above the machine and is controlled by a tap 3 for regulating the quantity of viscose allowed to fall upon a suitably-shaped perforated dropper plate or trough 4, through the perforations in which the viscose passes onto the surface of a heated cylinder 5. I employ two adjustable plates 6, carried by the frame, only one of which is shown. These plates regulate the width of the viscose on the cylinder 5, which is heated by means of steam admitted through its hollow axle in the ordinary manner well understood. The cylinder 5 is inclosed in a casing 7 and is slowly rotated by any suitable driving-gear (not shown) in the direction indicated by the arrows.

The viscose delivered through the perforated dropper-plate 4 is spread evenly and uniformly upon the surface of the heated cylinder 5 by means of a doctor-blade 8, mounted and arranged so as to be adjusted to and from the cylinder by means of a worm-wheel 9 and worm 10, mounted upon a shaft 10×, turned by a handle. (Not shown.) As the heated cylinder 5 is slowly rotated it carries forward the thin layer of viscose, which is rapidly dried by a current of hot air drawn through the pipe 11 by a fan from a suitable heater and traveling preferably, as indicated by the arrows, in the opposite direction to that in which the cylinder is rotating until finally conducted away through the discharge-pipe 12. The layer of viscose in the form of a continuous sheet, web, or film is led off the cylinder 5 around a hollow stripping-roller 13, which may or may not be cooled in any convenient manner. The stripping-roller 13 is carried in bearings in slide-blocks adjustable by means of screws 14. From the stripping-roller 13 the film passes under a guide-roller 15, over a guide-roller 16 to a batching-roller 17, which is driven by a belt 18 from a shaft 19. Brackets 20, which carry the batching-roller 17, are pivoted to the shaft 19, carried in bearings secured to a tank 21, so that the roller 17 can be raised out of the tank by moving a handle 22, cast with one bracket, and the brackets are maintained in position by a pawl 23, which engages with a ratchet-wheel 24, secured to the shaft 19. The batching-roller 17 is mounted in the tank 21 containing a saturated solution of boiling brine—that is to say, sodium chlorid solution—the object of this being to decompose the soluble cellulose sulfocarbonate or viscose and regenerate the insoluble cellulose in the film form. The film, now cellulose, when batched is subsequently washed, preferably in an open washing-machine of any suitable type, to remove the brine and any by-products from the decomposition of the viscose, and, if desired, may be subsequently treated with bleaching reagents or dyeing solutions, and is finally dried and rolled or otherwise made up in rolls or sheets of any desired length ready for use as required.

Beyond the stripping-roller 13 is mounted an adjustable stripping-blade 25, the function of which is to clean the surface of the cylinder by removing any viscose which may remain adhering to it, and behind the blade 25 is mounted a piece of cloth 26, one end of which is secured to a box-bracket 27, and the loose end of this cloth lies on the surface of the cylinder 5. On the top of the cloth and in the box-bracket 27 are placed pieces of paraffin-wax 28 or other suitable substance, which slowly melts and passes through the cloth onto the surface of the cylinder, which it covers with a slight waxed surface and so prevents the viscose adhering too firmly to the cylinder.

The machine described above is the same as that forming the subject-matter of an application for Letters Patent of the United States, Serial No. 722,330, filed June 29, 1899.

What I claim, and desire to secure by Letters Patent of the United States, is—

1. The method of producing cellulose films of any desired length by a continuous operation which consists in supplying viscose in a slowly-moving evenly-distributed layer or film, heating and drying said film and subjecting it to the action of brine to decompose the viscose and regenerate the insoluble cellulose in film form, substantially as described.

2. The method of producing cellulose films of any desired length by a continuous operation consisting in supplying viscose in a regulated and evenly-distributed quantity or film, heating the gradually-moving film and simultaneously subjecting it to a current of air traveling in the opposite direction, and subjecting said film to the action of boiling brine, substantially as described.

In witness whereof I have hereunto set my hand in presence of two witnesses.

JOHN CHRISTMAS CHORLEY.

Witnesses:
H. B. BARLOW,
HERBERT R. ABBEY.